(12) United States Patent
Jeon

(10) Patent No.: US 12,441,281 B2
(45) Date of Patent: Oct. 14, 2025

(54) BRAKE SYSTEM AND CONTROL METHOD THEREOF

(71) Applicant: HL MANDO CORPORATION, Gyeonggi-do (KR)

(72) Inventor: Namju Jeon, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 116 days.

(21) Appl. No.: 18/399,577

(22) Filed: Dec. 28, 2023

(65) Prior Publication Data
US 2025/0018909 A1   Jan. 16, 2025

(30) Foreign Application Priority Data

Jul. 13, 2023  (KR) ......................... 10-2023-0091112

(51) Int. Cl.
| | |
|---|---|
| B60T 8/00 | (2006.01) |
| B60T 8/171 | (2006.01) |
| B60T 8/1755 | (2006.01) |
| B60T 13/66 | (2006.01) |
| B60T 17/22 | (2006.01) |

(52) U.S. Cl.
CPC ............ B60T 8/1755 (2013.01); B60T 8/171 (2013.01); B60T 13/662 (2013.01); B60T 17/221 (2013.01)

(58) Field of Classification Search
CPC .......... B60W 50/02; B60W 2050/0215; B60Y 2400/3032; B60T 2270/30
See application file for complete search history.

(56) References Cited

U.S. PATENT DOCUMENTS

| | | | | |
|---|---|---|---|---|
| 6,382,739 | B1* | 5/2002 | Ohtsu | B60T 8/173 |
| | | | | 303/122.04 |
| 2006/0106513 | A1* | 5/2006 | Ohba | B60T 8/885 |
| | | | | 701/29.2 |
| 2008/0059021 | A1* | 3/2008 | Lu | B60G 17/0195 |
| | | | | 701/36 |
| 2014/0358373 | A1* | 12/2014 | Kikuchi | B60G 17/0185 |
| | | | | 701/38 |
| 2016/0231141 | A1* | 8/2016 | Endres | G01D 5/24466 |

(Continued)

FOREIGN PATENT DOCUMENTS

| | | |
|---|---|---|
| KR | 10-2013-0044734 | 5/2013 |
| KR | 10-2014-0050470 | 4/2014 |
| KR | 10-2022-0153717 | 11/2022 |

*Primary Examiner* — Phutthiwat Wongwian
*Assistant Examiner* — Sherman D Manley
(74) *Attorney, Agent, or Firm* — WOMBLE BOND DICKINSON (US) LLP

(57) ABSTRACT

Disclosed is a brake system. The brake system includes: an electronic control unit configured to perform an attitude control function based on a wheel speed sensor value received from each of a plurality of wheel speed sensors installed in a plurality of wheels of a vehicle, identify a failure of the attitude control function, and provide a braking signal to perform the attitude control function according to the identified result; and a brake configured to perform a braking control on a corresponding wheel based on the braking signal, wherein the electronic control unit is configured to identify a failure of at least one of the plurality of wheel speed sensors while performing the attitude control function, and set an operation mode of an Electronic Stability Control (ESC) according to the identified result.

20 Claims, 5 Drawing Sheets

(56) References Cited

U.S. PATENT DOCUMENTS

| | | | | |
|---|---|---|---|---|
| 2018/0178767 | A1* | 6/2018 | Chanda | B60R 16/0232 |
| 2019/0135272 | A1* | 5/2019 | Safstrom | B60T 8/1755 |
| 2020/0114889 | A1* | 4/2020 | Egnor | B60T 11/20 |
| 2020/0192396 | A1* | 6/2020 | Lee | G01C 21/14 |
| 2020/0223408 | A1* | 7/2020 | Goto | B60T 13/662 |
| 2020/0384967 | A1* | 12/2020 | Hiraga | B60T 8/245 |
| 2020/0384979 | A1* | 12/2020 | Hiraga | B60T 8/17554 |
| 2020/0406869 | A1* | 12/2020 | Hwang | B60T 17/22 |
| 2022/0379856 | A1* | 12/2022 | Ando | B60T 13/745 |
| 2023/0087332 | A1* | 3/2023 | Dieckmann | B60T 8/1708 701/70 |
| 2024/0124000 | A1* | 4/2024 | Farrell | B60W 50/14 |
| 2024/0383457 | A1* | 11/2024 | Xia | B60T 8/17551 |

* cited by examiner

FIG. 5

| FL | FR | RL | RR | ESC Avail | CONTROL METHOD |
|----|----|----|----|-----------|----------------|
| ○ | ○ | ○ | × | Available (ESC AVAILABLE MODE) (ALLOW CONTROL OF ONLY OS/US 1 WHEEL) | ESC OS : FRONT OUTER WHEEL CONTROL<br>ESC US : FRONT INNER WHEEL CONTROL |
| ○ | ○ | × | ○ | | |
| ○ | ○ | × | × | | ESC OS : FRONT OUTER WHEEL CONTROL<br>ESC US : FRONT INNER WHEEL CONTROL |
| ○ | × | ○ | × | | |
| × | ○ | ○ | × | | |
| × | × | ○ | × | | |
| OTHERS | | | | Disable (ESC DISABLE MODE) | |

BRAKE SYSTEM AND CONTROL METHOD THEREOF

CROSS-REFERENCE TO RELATED APPLICATION(S)

This application is based on and claims priority under 35 U.S.C. § 119 to Korean Patent Application No. 10-2023-0091112, filed on Jul. 13, 2023, in the Korean Intellectual Property Office, the disclosure of which is incorporated by reference herein in its entirety.

BACKGROUND

1. Field

The disclosure relates to a brake system capable of maintaining an attitude control function even upon a failure of some wheel speed sensors, and a method for controlling the brake system.

2. Description of the Related Art

An Electronic Stability Control (ESC) is a system for controlling the driving stability of the vehicle by detecting the driving conditions of the vehicle and road conditions. When the vehicle slips or falls into an uncontrollable situation while driving, the ESC automatically adjusts the brakes and engine to keep the vehicle stable. For this purpose, vehicles are equipped with various sensors, such as wheel speed sensors, acceleration sensors, direction sensors, and rotation sensors, and ESCs analyze data collected from the sensors in real time and predict the driving conditions of the vehicles and road conditions.

For example, in the case in which the vehicle loses its direction when the driver makes a sudden stop or turns a curve, the ESC detects this situation and intervenes to stabilize the vehicle. Also, the ESC controls each of the brakes of the vehicle to adjust the rotation speed of each wheel. Thereby, the ESC controls the driving direction of the vehicle and prevents slipping or sliding.

More specifically, the ESC predicts the motion of the vehicle by analyzing the driving conditions of the vehicle and road conditions based on data transferred from the wheel speed sensors, and detects a situation of a wheel slip, etc. For example, in the case in which the speed of a wheel decreases more rapidly than the other wheels when the driver makes a sudden stop or turns a curve, the ESC may apply a little more brake to the corresponding wheel to control the direction of the vehicle and prevent a wheel slip, thereby providing the driving stability of the vehicle.

However, when any one of the wheel speed sensors fails, the ESC is limited in its functions because the ESC fails to calculate a wheel slip. Accordingly, when the wheel speed sensors fail, the attitude control function of the vehicle is deactivated, which may have a negative effect on the driving stability.

SUMMARY

It is an aspect of the disclosure to provide a vehicle brake system capable of maintaining an Electronic Stability Control (ESC) function even when a wheel speed sensor or two specific wheel speed sensors fail, and a method for controlling the vehicle brake system.

Additional aspects of the disclosure will be set forth in part in the description which follows and, in part, will be obvious from the description, or may be learned by practice of the disclosure.

In accordance with an aspect of the disclosure, a vehicle brake system may include, an electronic control unit configured to perform an attitude control function based on a wheel speed sensor value received from each of a plurality of wheel speed sensors installed in a plurality of wheels of a vehicle, identify a failure of the attitude control function, and provide a braking signal to perform the attitude control function according to the identified result, and a brake configured to perform a braking control on a corresponding wheel based on the braking signal, wherein the electronic control unit is configured to identify a failure of at least one of the plurality of wheel speed sensors while performing the attitude control function, and set an operation mode of an Electronic Stability Control (ESC) according to the identified result.

The electronic control unit may operate in an ESC available mode according to a failure of a wheel speed sensor or failures of two wheel speed sensors of front wheels or two wheel speed sensors of rear wheels.

The electronic control unit may operate in an ESC disable mode according to failures of two wheel speed sensors being a wheel speed sensor of front wheels and a wheel speed sensor of rear wheels.

The electronic control unit may operate in an ESC disable mode according to failures of three wheel speed sensors or more.

The electronic control unit may operate in an ESC normal mode according to availability of all the plurality of wheel speed sensors.

In the ESC available mode, the electronic control unit may identify, based on failures of two wheel speed sensors of the rear wheels, a situation of oversteer or understeer and provide a braking signal to a brake of a wheel of the front wheels depending on the identified result.

Based on identifying a situation of oversteer, the electronic control unit may provide the braking signal to a brake of a wheel located outward in a rotation direction of the vehicle among the front wheels.

Based on identifying a situation of understeer, the electronic control unit may provide the braking signal to a brake of a wheel located inward in a rotation direction of the vehicle among the front wheels.

In the ESC available mode, the electronic control unit may identify a situation of oversteer or understeer based on failures of two wheel speed sensors of the front wheels, and provide a braking signal to a brake of a wheel among the rear wheels depending on the identified result.

Based on identifying a situation of oversteer, the electronic control unit may provide the braking signal to a brake of a wheel located outward in a rotation direction of the vehicle among the rear wheels.

Based on identifying a situation of understeer, the electronic control unit may provide the braking signal to a brake of a wheel located inward in a rotation direction of the vehicle among the rear wheels.

The electronic control unit may identify a situation of understeer according to a yaw difference being a first threshold value or less, and identify a situation of oversteer based on a yaw difference being a second threshold value or more.

The electronic control unit may provide, as the braking signal, a target wheel slip obtained based on the yaw difference, and the brake may receive the braking signal and perform a braking control on a corresponding wheel by obtaining target braking pressure based on the target wheel slip.

In accordance with an aspect of the disclosure, a method for controlling a vehicle brake system may include performing an attitude control function based on a wheel speed sensor value received from each of a plurality of wheel speed sensors installed in a plurality of wheels of a vehicle, identifying a failure of the attitude control function, and identifying a failure of at least one of the plurality of wheel speed sensors according to availability of the attitude control function, identifying availability of the attitude control function according to a failure of at least one of the plurality of wheel speed sensors, and performing an Electronic Stability Control (ESC) available mode according to availability of the attitude control function.

The identifying of the availability of the attitude control function according to the failure of at lease one of the plurality of wheel speed sensors may include identifying availability of the attitude control function according to a failure of a wheel speed sensor or failures of two wheel speed sensors of front wheels or two wheel speed sensors of rear wheels.

The identifying of the availability of the attitude control function according to the failure of at lease one of the plurality of wheel speed sensors may include identifying unavailability of the attitude control function according to failures of two wheel speed sensors being a wheel speed sensor of front wheels and a wheel speed sensor of rear wheels, and performing an ESC disable mode.

The method may further comprise, after the identifying of the availability of the attitude control function according to the failure of at least one of the plurality of wheel speed sensors, performing an ESC disable mode according to failures of three wheel speed sensors or more.

The performing of the ESC available mode according to the availability of the attitude control function may include identifying, according to failures of two wheel speed sensors of the rear wheels, a situation of oversteer or understeer, providing a braking signal to a brake of a wheel of the front wheels according to the identified result, and providing, according to failures of two wheel speed sensors of the front wheels, the braking signal to a brake of a wheel of the rear wheels according to the identified result.

The method may further comprise, providing, in a situation of oversteer, the braking signal to a brake of a wheel located outward in a rotation direction of the vehicle among the front wheels or the rear wheels, and providing, in a situation of understeer, the braking signal to a brake of a wheel located inward in the rotation direction of the vehicle among the front wheels or the rear wheels.

The method may further comprise, identifying a situation of understeer according to a yaw difference being a first threshold value or less, identifying a situation of oversteer according to a yaw difference being a second threshold value or more, providing, as the braking signal, a target wheel slip obtained based on the yaw difference, and performing a braking control on a corresponding wheel by obtaining target braking pressure based on the target wheel slip.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 5 illustrates an ESC control scenario according to a failure of a wheel speed sensor, according to an embodiment.

DETAILED DESCRIPTION

Figure 1:
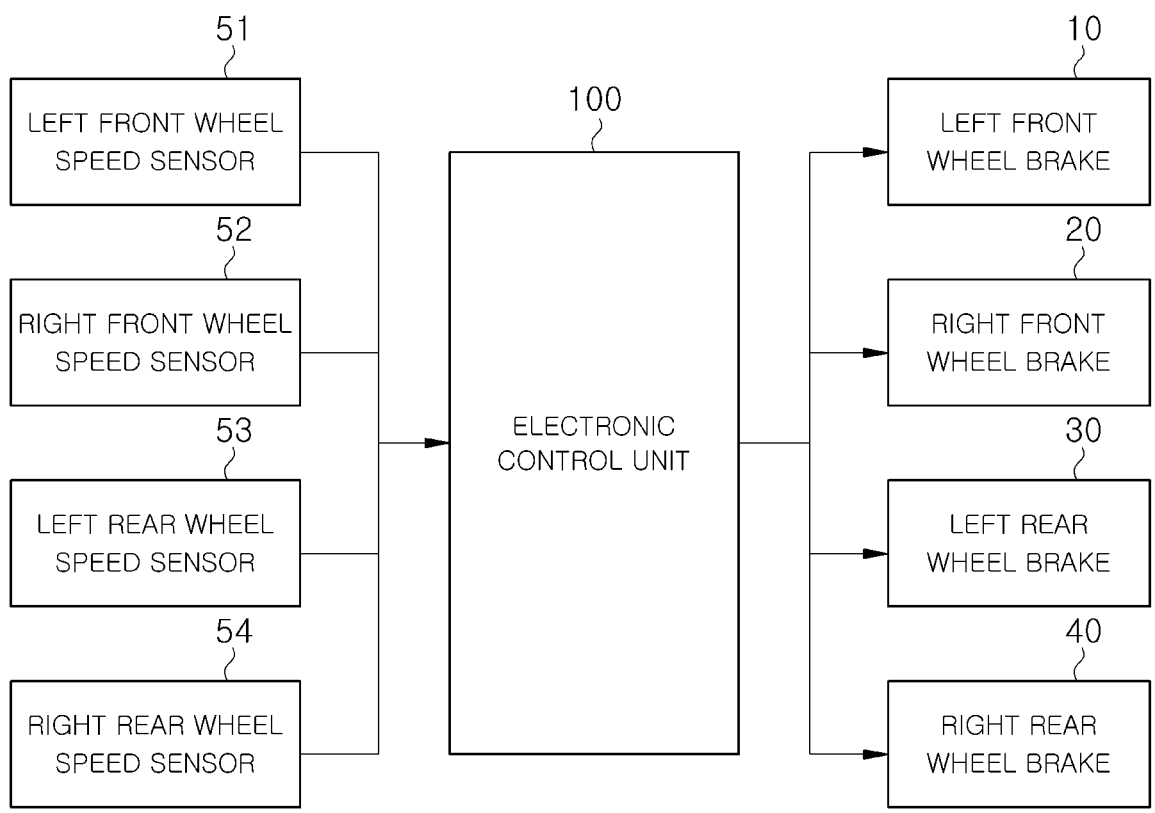
FIG. 1 schematically illustrates a configuration of a vehicle brake system according to an embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

FIG. 1 schematically illustrates a configuration of a vehicle brake system according to an embodiment.

Referring to FIG. 1, the vehicle brake system according to an embodiment of the disclosure may include an electronic control unit 100, a left front wheel speed sensor 51, a right front wheel speed sensor 52, a left rear wheel speed sensor 53, a right rear wheel speed sensor 54, a left front wheel brake 10, a right front wheel brake 20, a left rear wheel brake 30, and a right rear wheel brake 40.

The left front wheel speed sensor 51, the right front wheel speed sensor 52, the left rear wheel speed sensor 53, and the right rear wheel speed sensor 54 may be installed in the respective wheels of the vehicle to detect rotation speed of the wheels and obtain wheel speed sensor values.

The electronic control unit 100 may perform an attitude control function based on the wheel speed sensor values received from the left front wheel speed sensor 51, the right front wheel speed sensor 52, the left rear wheel speed sensor 53, and the right rear wheel speed sensor 54.

The electronic control unit 100 may identify a failure of the attitude control function.

When the electronic control unit 100 identifies a failure of the attitude control function, the electronic control unit 100 may not consider a failure of the wheel speed sensors. The electronic control unit 100 may identify a failure of the wheel speed sensors only while performing the attitude control function. The reason may be because an object of the disclosure is to maintain the attitude control function even upon a failure of the wheel speed sensors.

According to a failure of the attitude control function, the electronic control unit 100 may not perform the attitude control function.

When the attitude control function has not failed, the electronic control unit 100 may provide a braking signal to a brake to perform the attitude control function.

The electronic control unit 100 may identify a failure of any wheel speed sensor while performing the attitude control function, and set an operation mode of Electronic Stability Control (ESC) according to the identified result.

When a wheel speed sensor has failed, or when two wheel speed sensors have failed and a wheel speed sensor of front wheels and a wheel speed sensor of rear wheels have not failed, the electronic control unit 100 may operate in an ESC available mode.

When two wheel speed sensors have failed and a wheel speed sensor of the front wheels and a wheel speed sensor of the rear wheels have failed, the electronic control unit 100 may operate in an ESC disable mode.

When three wheel speed sensors or more have failed, the electronic control unit 100 may operate in the ESC disable mode.

When no wheel speed sensor has failed, the electronic control unit 100 may operate in an ESC normal mode.

In the ESC available mode, the electronic control unit 100 may identify a situation of oversteer or understeer when a failed wheel speed sensor exists only in the rear wheels, and provide a braking signal to a brake of any one of the front wheels according to the identified result.

In a situation of oversteer, the electronic control unit 100 may provide the braking signal to a brake of a wheel located outward in a rotation direction of the vehicle among the front wheels.

In a situation of understeer, the electronic control unit 100 may provide the braking signal to a brake of a wheel located inward in the rotation direction of the vehicle among the front wheels.

In the ESC available mode, when a failed wheel speed sensor exists only in the front wheels, the electronic control unit 100 may identify a situation of oversteer or understeer and provide a braking signal to a brake of any one of the rear wheels according to the identified result.

In a situation of oversteer, the electronic control unit 100 may provide the braking signal to a brake of a wheel located outward in a rotation direction of the vehicle among the rear wheels.

In a situation of understeer, the electronic control unit 100 may provide the braking signal to a brake of a wheel located inward in the rotation direction of the vehicle among the rear wheels.

According to a yaw difference being a first threshold value or less, the electronic control unit 100 may identify a situation of understeer, and according to a yaw difference being a second threshold value or more, the electronic control unit 100 may identify a situation of oversteer.

The electronic control unit 100 may provide, as the braking signal, a target wheel slip obtained based on the yaw difference.

In the ESC normal mode, when a situation of oversteer occurs, the electronic control unit 100 may provide a braking signal to a brake of a wheel located outward in a rotation direction of the vehicle among the front wheels, and when a situation of understeer occurs, the electronic control unit 100 may provide a braking signal to a brake of a wheel located inward in the rotation direction of the vehicle among the rear wheels.

The brake may receive the braking signal, and obtain target braking pressure based on the target wheel slip to thereby perform a braking control on the corresponding wheel.

The brake may include the left front wheel brake 10, the right front wheel brake 20, the left rear wheel brake 30, and the right rear wheel brake 40.

The brake may perform a braking control on the corresponding wheel based on the braking signal.

The electronic control unit 100, the left front wheel speed sensor 51, the right front wheel speed sensor 52, the left rear wheel speed sensor 53, the right rear wheel speed sensor 54, the left front wheel brake 10, the right front wheel brake 20, the left rear wheel brake 30, and the right rear wheel brake 40 may communicate with each other through a communication network NT for vehicle. For example, electrical devices included in the vehicle may transmit/receive data to/from each other through the Ethernet, Media Oriented Systems Transport (MOST), Flexray, Controller Area Network (CAN), Local Interconnect Network (LIN), or the like.

Figure 2:
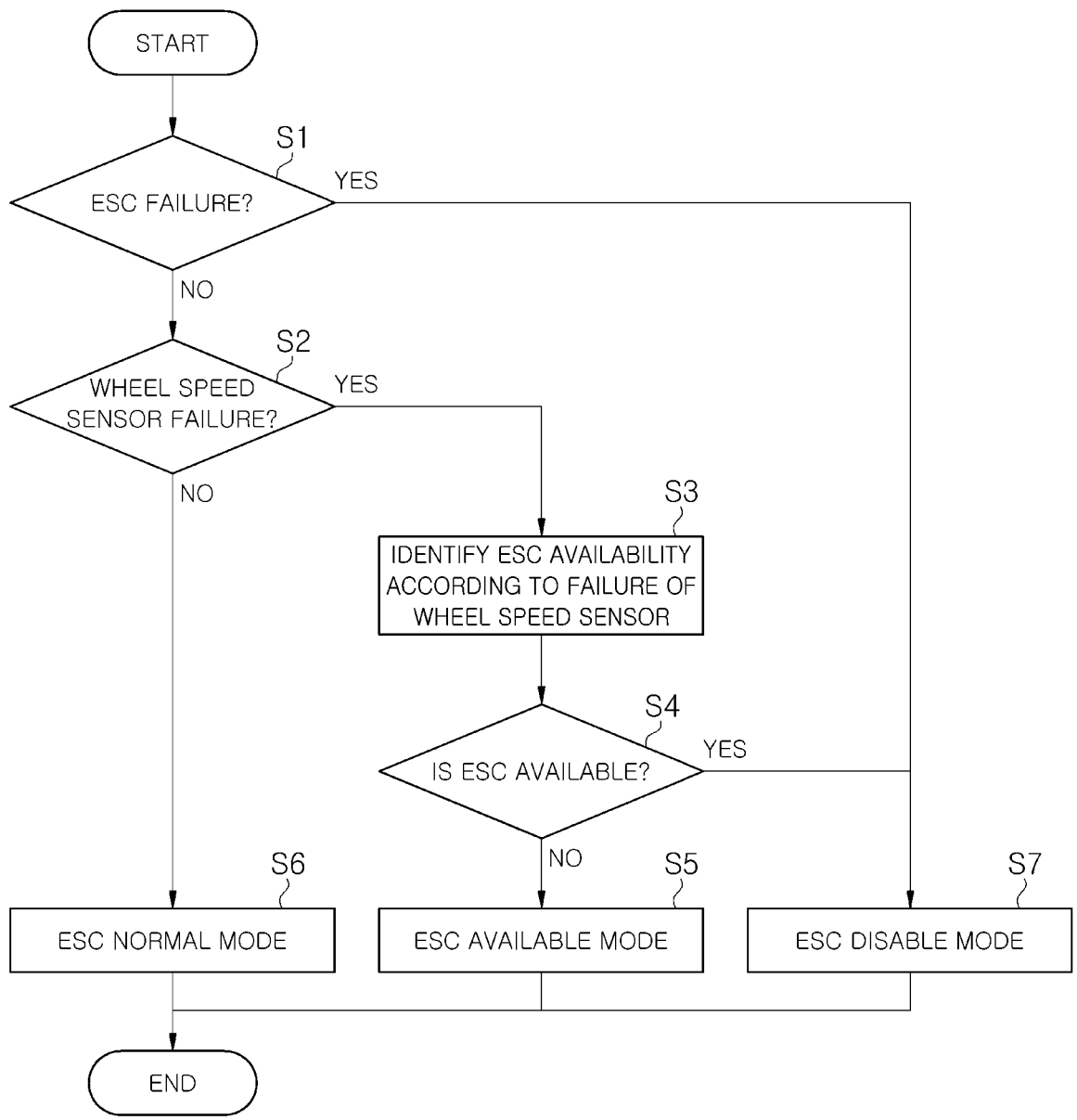
FIG. 2 is a flowchart illustrating an attitude control method of a vehicle, according to an embodiment.

FIG. 2 is a flowchart illustrating an attitude control method of a vehicle, according to an embodiment.

Referring to FIG. 2, in the vehicle brake system for performing the attitude control function based on wheel speed sensor values received from the wheel speed sensors installed in the respective wheels of the vehicle, the attitude control method of the vehicle may include: operation S1 of identifying a failure of the attitude control function; operation S2 of identifying, according to availability of the attitude control function, a failure of any one(s) of the wheel speed sensors; operation S3 of identifying availability of the attitude control function according to a failure of any one(s) of the wheel speed sensors; and operation S5 of performing the ESC available mode according to availability of the attitude control function.

In operation S1 of identifying the failure of the attitude control function, a failure of any wheel speed sensor may be not considered. A failure of any wheel speed sensor may be identified only while the attitude control function is performed (S2). The reason may be because an object of the disclosure is to maintain the attitude control function even upon a failure of any wheel speed sensor.

Operation S2 of identifying, according to availability of the attitude control function, a failure of any one(s) of the wheel speed sensors may further include operation S6 of performing the ESC normal mode when none of the wheel speed sensors has failed.

Operation S3 of identifying, according to a failure of any wheel speed sensor, availability of the attitude control function may identify availability of the attitude control function when a wheel speed sensor has failed, or when two wheel speed sensors have failed and a wheel speed sensor of the front wheels and a wheel speed sensor of the rear wheels have not failed.

Operation S3 of identifying availability of the attitude control function according to a failure of any one(s) of the wheel speed sensors may further include operation S7 of identifying unavailability of the attitude control function when two wheel speed sensors have failed and a wheel speed sensor of the front wheels and a wheel speed sensor of the rear wheels have failed and performing the ESC inhabited mode.

Operation S3 of identifying availability of the attitude control function according to a failure of any one(s) of the wheel speed sensors may perform the ESC disable mode when three wheel speed sensors or more have failed.

Operation S5 of performing the ESC available mode according to availability of the attitude control function may identify a situation of oversteer or understeer when a failed wheel speed sensor exists only in the rear wheels, providing a braking signal to a brake of any one of the front wheels according to the identified result, and providing, when a failed speed sensor exists in the front wheels, the braking signal to a brake of any one of the rear wheels according to the identified result.

In a situation of oversteer, the braking signal may be provided to a brake of a wheel located outward in a rotation direction of the vehicle among the front wheels or the rear wheels, and in a situation of understeer, the braking signal may be provided to a brake of a wheel located inward in the rotation direction of the vehicle among the front wheels or the rear wheels.

According to a yaw difference being the first threshold value or less, a situation of understeer may be identified, and according to a yaw difference being the second threshold value or more, a situation of oversteer may be identified. A target wheel slip obtained based on the yaw difference may be provided as the braking signal, target braking pressure may be obtained based on the target wheel slip, and thereby, a braking control on the corresponding wheel may be performed.

In operation S6 of performing the ESC normal mode, when a situation of oversteer occurs, a braking signal may be provided to a brake of a wheel located outward in a rotation direction of the vehicle among the front wheels, and, when a situation of understeer occurs, a braking signal may be provided to a brake of a wheel located inward in the rotation direction of the vehicle among the rear wheels.

Figure 3:
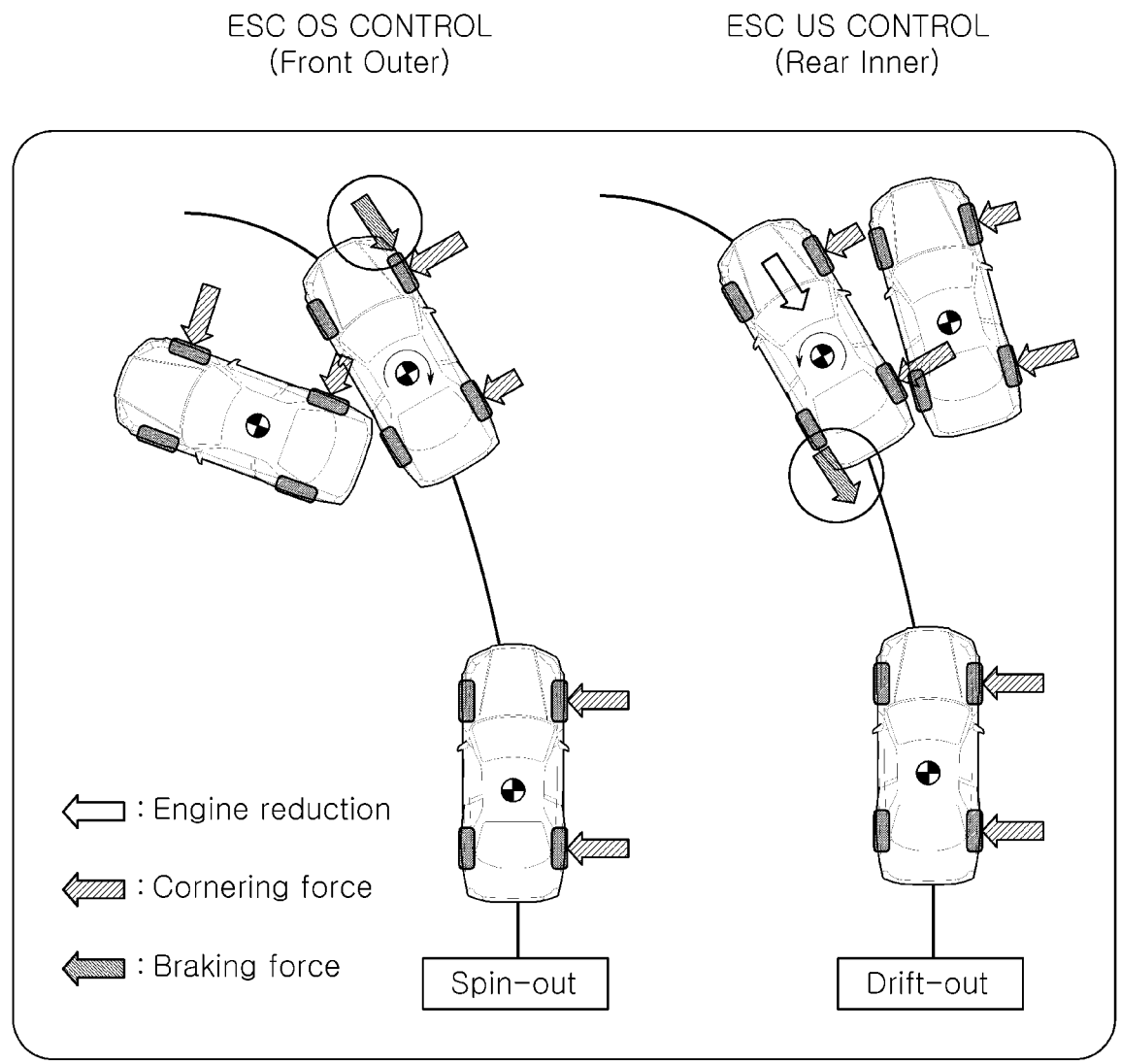
FIG. 3 illustrates a braking control method in an Electronic Stability Control (ESC) normal mode according to an embodiment.

Operation S6 will be described with reference to FIG. 3, below. When the vehicle turning left is in a situation of oversteer, a braking signal may be provided to the right front wheel brake 20 in the ESC normal mode. In contrast, when the vehicle turning right is in a situation of oversteer, a braking signal may be provided to the left front wheel brake 10 in the ESC normal mode. Also, when the vehicle turning left is in a situation of understeer, a braking signal may be provided to the left rear wheel brake 23 in the ESC normal mode. In contrast, when the vehicle turning right is in a situation of understeer, a braking signal may be provided to the right rear wheel brake 40 in the ESC normal mode.

Figure 4:
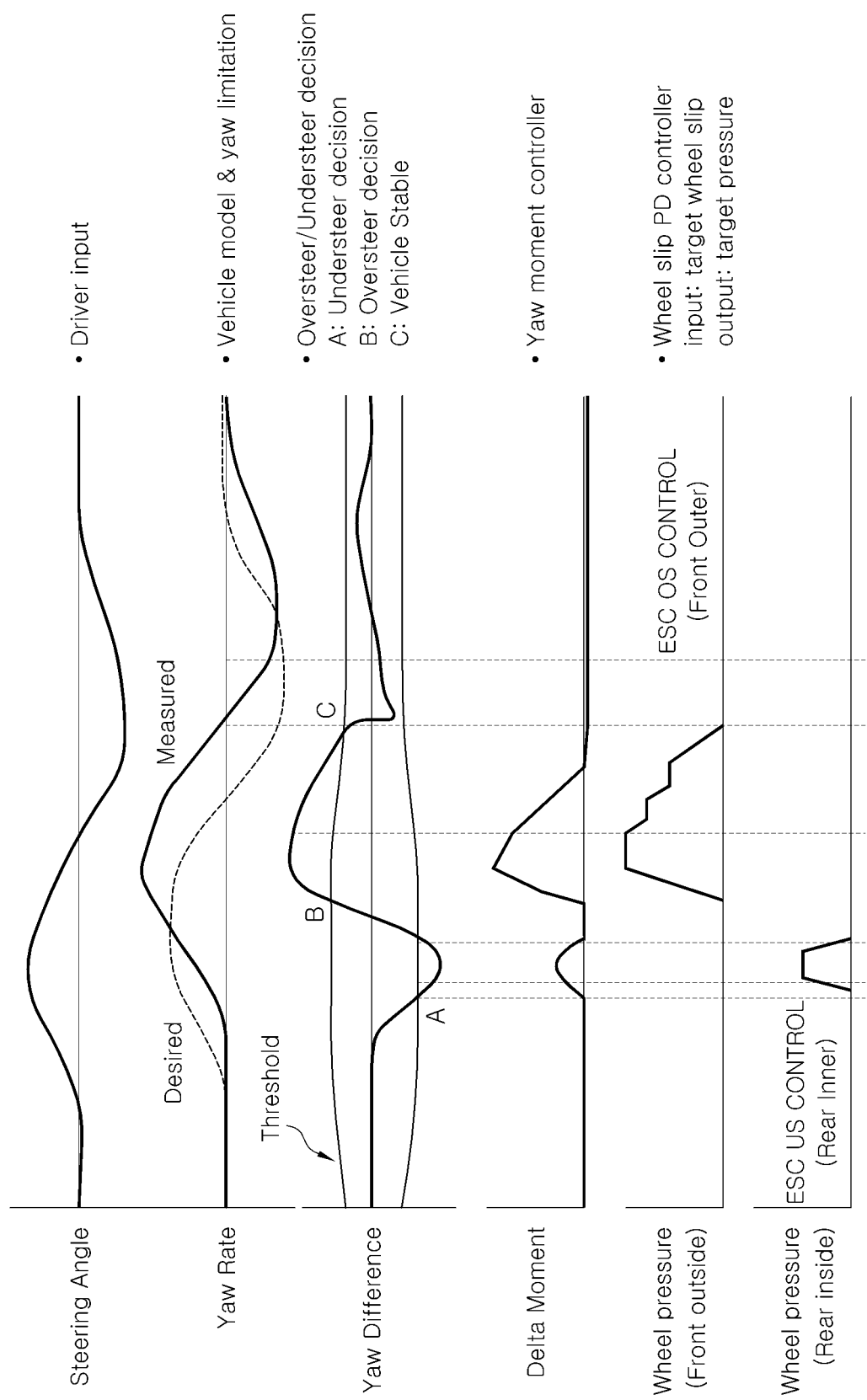
FIG. 4 illustrates an ESC control and changes of parameters related to the ESC control according to a failure of a wheel speed sensor, according to an embodiment.

FIG. 4 illustrates an ESC control and changes of parameters related to the ESC control according to a failure of a wheel speed sensor, according to an embodiment, and FIG. 5 illustrates an ESC control scenario according to a failure of a wheel speed sensor, according to an embodiment.

Referring to FIGS. 4 and 5, when an actual yaw difference according to a change of a steering angle is a first threshold value A or less, a situation of understeer may be identified. When an actual yaw difference according to a change of a steering angle is a second threshold value B or more, a situation of oversteer may be identified.

According to the situation of oversteer and/or understeer and an ESC mode, the electronic control unit 100 may provide a braking signal, that is, a target wheel slip obtained based on a yaw difference, to a brake of a preset wheel.

As shown in FIG. 5, when a wheel speed sensor has failed, or when two wheel speed sensors have failed and a wheel speed sensor of the front wheels and a wheel speed sensor of the rear wheels have not failed, the electronic control unit 100 may operate in the ESC available mode.

In other cases, the electronic control unit 100 may operate in the ESC disable mode.

When the electronic control unit 100 operates in the ESC available mode, the electronic control unit 100 may control only a wheel in a situation of oversteer or understeer.

When a failed wheel speed sensor exists only in the rear wheels, as described above, a control signal may be provided to a brake of a wheel located outward in a rotation direction of the vehicle among the front wheels (oversteer situation), or to a brake of a wheel located inward in the rotation direction of the vehicle among the front wheels (understeer situation).

Likewise, when a failed wheel speed sensor exists only in the front wheels, a control signal may be provided to a brake of a wheel located outward in a rotation direction of the vehicle among the rear wheels (oversteer situation), or to a brake of a wheel located inward in the rotation direction of the vehicle among the rear wheels (understeer situation).

According to an aspect of the disclosure, there may be provided the brake system capable of performing the attitude control function even upon a failure of a wheel speed sensor or two specific wheel speed sensors, and the method for controlling the brake system.

Accordingly, driving stability of the vehicle may be maintained even in a failure situation of the wheel speed sensors.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A vehicle brake system comprising:
    an electronic control unit configured to perform an attitude control function based on a wheel speed sensor value received from each of a plurality of wheel speed sensors installed in a plurality of wheels of a vehicle, identify a failure of the attitude control function, and provide a braking signal to perform the attitude control function according to the identified result; and
    a brake configured to perform a braking control on a corresponding wheel based on the braking signal,
    wherein the electronic control unit is configured to identify a failure of at least one of the plurality of wheel speed sensors while performing the attitude control function, and set an operation mode of an Electronic Stability Control (ESC) according to the identified result.

2. The vehicle brake system of claim 1, wherein the electronic control unit is configured to operate in an ESC available mode according to a failure of a wheel speed sensor or failures of two wheel speed sensors of front wheels or two wheel speed sensors of rear wheels.

3. The vehicle brake system of claim 1, wherein the electronic control unit is configured to operate in an ESC disable mode according to failures of two wheel speed sensors being a wheel speed sensor of front wheels and a wheel speed sensor of rear wheels.

4. The vehicle brake system of claim 1, wherein the electronic control unit is configured to operate in an ESC disable mode according to failures of three wheel speed sensors or more.

5. The vehicle brake system of claim 1, wherein the electronic control unit is configured to operate in an ESC normal mode according to availability of all the plurality of wheel speed sensors.

6. The vehicle brake system of claim 2, wherein in the ESC available mode, the electronic control unit is configured to identify, based on failures of two wheel speed sensors of the rear wheels, a situation of oversteer or understeer and provide a braking signal to a brake of a wheel of the front wheels depending on the identified result.

7. The vehicle brake system of claim 6, wherein, based on identifying a situation of oversteer, the electronic control unit is configured to provide the braking signal to a brake of a wheel located outward in a rotation direction of the vehicle among the front wheels.

8. The vehicle braking system of claim 6, wherein, based on identifying a situation of understeer, the electronic control unit is configured to provide the braking signal to a brake of a wheel located inward in a rotation direction of the vehicle among the front wheels.

9. The vehicle braking system of claim 2, wherein, in the ESC available mode, the electronic control unit is configured to identify a situation of oversteer or understeer based on failures of two wheel speed sensors of the front wheels, and provide a braking signal to a brake of a wheel among the rear wheels depending on the identified result.

10. The vehicle braking system of claim 9, wherein, based on identifying a situation of oversteer, the electronic control unit is configured to provide the braking signal to a brake of a wheel located outward in a rotation direction of the vehicle among the rear wheels.

11. The vehicle braking system of claim 9, wherein, based on identifying a situation of understeer, the electronic control unit is configured to provide the braking signal to a brake of a wheel located inward in a rotation direction of the vehicle among the rear wheels.

12. The vehicle braking system of claim 6, wherein the electronic control unit is configured to identify a situation of understeer according to a yaw difference being a first threshold value or less, and identify a situation of oversteer based on a yaw difference being a second threshold value or more.

13. The vehicle braking system of claim 12, wherein the electronic control unit is configured to provide, as the braking signal, a target wheel slip obtained based on the yaw difference, and
    the brake is configured to receive the braking signal and perform a braking control on a corresponding wheel by obtaining target braking pressure based on the target wheel slip.

14. A method for controlling a vehicle brake system, comprising:
    performing an attitude control function based on a wheel speed sensor value received from each of a plurality of wheel speed sensors installed in a plurality of wheels of a vehicle,
    identifying a failure of the attitude control function, and
    identifying a failure of at least one of the plurality of wheel speed sensors according to availability of the attitude control function;
    identifying availability of the attitude control function according to a failure of at lease one of the plurality of wheel speed sensors; and
    performing an Electronic Stability Control (ESC) available mode according to availability of the attitude control function.

15. The method of claim 14, wherein the identifying of the availability of the attitude control function according to the failure of at lease one of the plurality of wheel speed sensors comprises identifying availability of the attitude control function according to a failure of a wheel speed sensor or failures of two wheel speed sensors of front wheels or two wheel speed sensors of rear wheels.

16. The method of claim 14, wherein the identifying of the availability of the attitude control function according to the failure of at lease one of the plurality of wheel speed sensors comprises identifying unavailability of the attitude control function according to failures of two wheel speed sensors being a wheel speed sensor of front wheels and a wheel speed sensor of rear wheels, and performing an ESC disable mode.

17. The method of claim 14, further comprising, after the identifying of the availability of the attitude control function according to the failure of at least one of the plurality of wheel speed sensors, performing an ESC disable mode according to failures of three wheel speed sensors or more.

18. The method of claim 15, wherein the performing of the ESC available mode according to the availability of the attitude control function comprises identifying, according to failures of two wheel speed sensors of the rear wheels,
a situation of oversteer or understeer, providing a braking signal to a brake of a wheel of the front wheels according to the identified result, and providing, according to failures of two wheel speed sensors of the front wheels, the braking signal to a brake of a wheel of the rear wheels according to the identified result.

19. The method of claim 18, further comprising,
providing, in a situation of oversteer, the braking signal to a brake of a wheel located outward in a rotation direction of the vehicle among the front wheels or the rear wheels, and
providing, in a situation of understeer, the braking signal to a brake of a wheel located inward in the rotation direction of the vehicle among the front wheels or the rear wheels.

20. The method of claim 19, further comprising identifying a situation of understeer according to a yaw difference being a first threshold value or less, identifying a situation of oversteer according to a yaw difference being a second threshold value or more, providing, as the braking signal, a target wheel slip obtained based on the yaw difference, and performing a braking control on a corresponding wheel by obtaining target braking pressure based on the target wheel slip.

* * * * *